Patented Oct. 3, 1950

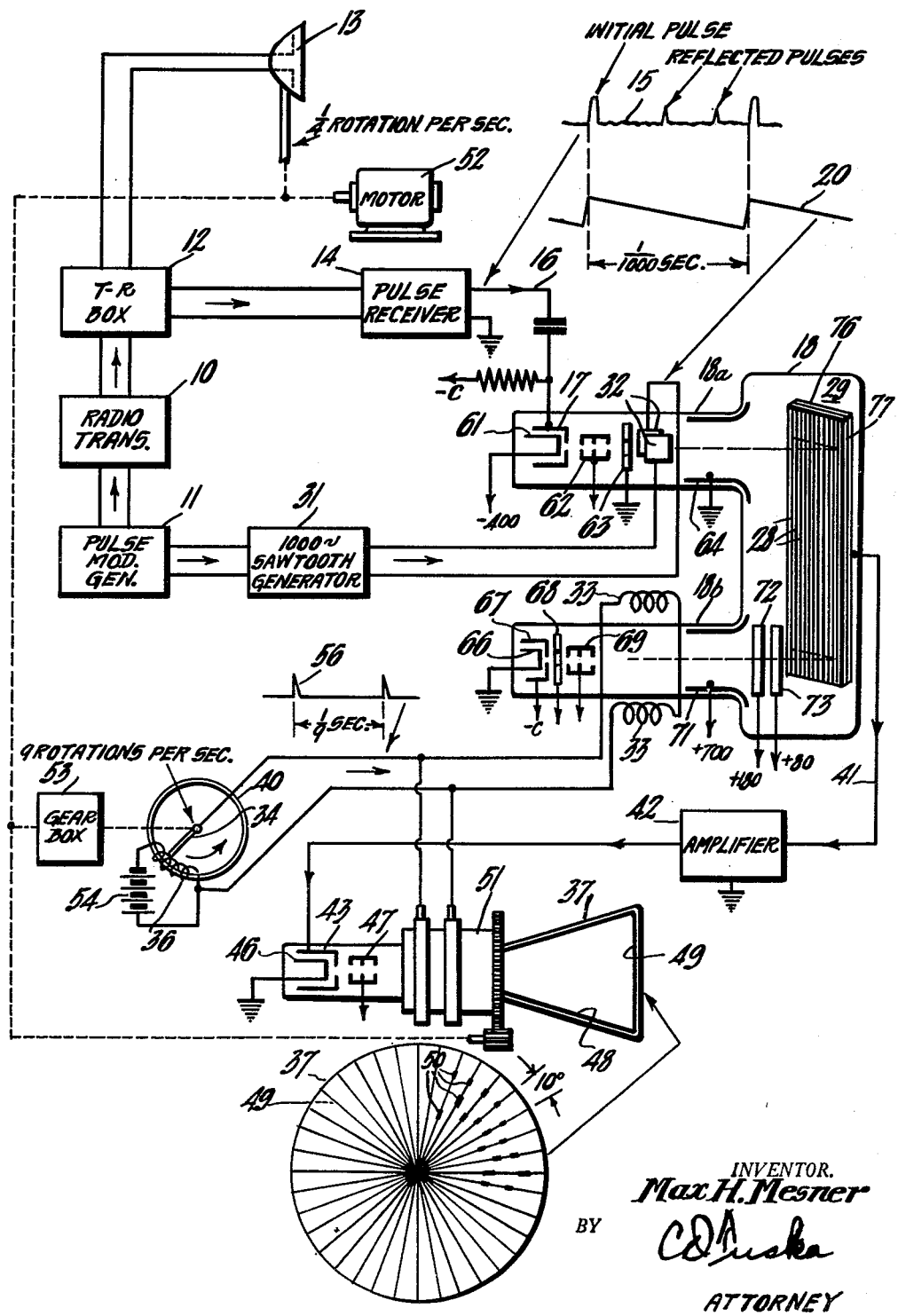

2,524,295

UNITED STATES PATENT OFFICE 2,524,295

PULSE-ECHO RADIO LOCATOR SYSTEM

Max H. Mesner, Princeton, N. J., assignor to Radio Corporation of America, a corporation of Delaware Application September 24, 1945, Serial No. 618,341

2 Claims. (Cl. 343—11)

1

My invention relates to radar systems and particularly to radio locator systems such as those of the type known as the plan-position-indicator (P. P. I.) systems.

An object of the invention is to provide a method of and means for obtaining improved radio locator indications.

A further object of the invention is to provide a method of and means for improving the signal-to-noise ratio in a radio locator system.

A still further object of the invention is to provide an improved radar system of the type giving both distance and angular position information.

The invention will be described as applied to a P. P. I. system wherein radio pulses are radiated from a directive antenna while it is being rotated to scan a certain area. In the case illustrated, the antenna is rotated through 360°. The P. P. I. picture appears on the screen of a cathode ray tube that has a rotatable deflecting yoke. The deflecting yoke is rotated in synchronism with the directive antenna and, at the same time, a sawtooth deflecting current is supplied to the yoke for deflecting the cathode ray of the indicator tube radially in synchronism with the radio pulse transmission.

According to the present invention, the above-mentioned radial deflection is produced after a plurality of radio pulses have been radiated from the antenna and after the resulting reflected pulses picked up by the antenna have been stored on the storage screen of a cathode ray storage tube. The stored pulses are taken off the storage screen during and in synchronism with the radial deflection of the indicator tube beam. The pulses thus taken off are applied to a control electrode of said indicator tube. Since noise signals occur at random intervals whereas the radio pulses occur at regular intervals, an improvement in the signal-to-noise ratio may be obtained in this way.

The invention will be better understood from the following description taken in connection with the accompanying drawing in which the single figure is a block and circuit diagram of one embodiment of the invention.

Referring to the drawing, there is shown a radar system comprising a radar station of the pulse-echo type. The radar station comprises a radio transmitter 10 which is pulse modulated by electrical pulses supplied from a pulse generator 11. The radio pulses from transmitter 10 are supplied through an antenna duplexer unit, such as the T-R box 12, to a directive antenna 13. The T-R box may be of the type described in application Serial No. 483,959, filed April 21, 1943,

2 in the name of Thomas L. Gottier and entitled Antenna Duplexing. Reflected pulses are picked up by the antenna 13 and supplied through the T-R box 12 to a radio pulse receiver 14 where they are amplified and demodulated. The resulting video-frequency pulses, indicated in the graph 15 as "reflected pulses," are supplied over a conductor 16 to a control electrode 17 in the "put-on" section 18a of a storage tube 18. The electron beam of the "put-on" section is deflected transversely across the storage element strips 28 of a storage screen 29 in synchronism with the modulating pulses produced by the pulse generator 11. This deflection of the "put-on" beam is produced by sawtooth voltage waves, shown by the graph 20, which are supplied from a sawtooth generator 31 to a pair of deflecting plates 32.

The particular storage tube that is illustrated is the same as that described in application Serial No. 492,658, filed June 26, 1943, in the names of Harley Iams, Albert Rose and Gardiner L. Krieger and entitled Cathode Ray Storage Tube, now Patent No. 2,454,652, issued November 23, 1948.

The reflected pulses which have been stored on the storage element strips 28 by the put-on beam are taken off the storage screen 29 by the take-off cathode ray or beam which is produced in a take-off section 18b. The take-off beam is deflected transversely across the storage strips 28 by means of a pair of deflecting coils 33 which are supplied with sawtooth current from a rotating potentiometer arm 34 that makes sliding contact with a potentiometer resistor 36. This deflection of the take-off beam is in synchronism with the deflection of the cathode ray of a cathode-ray indicator tube 37.

The signal pulses taken off the storage screen 29 by the take-off beam are supplied over a conductor 41 and through an amplifier 42 to the control grid 43 of the indicator tube 37.

The indicator tube 37 is of conventional design and comprises a cathode 46, the control grid 43, a first anode 47, a second anode 48, and a phosphorescent screen 49. A deflecting yoke 51 is rotatably mounted on the tube 37. The yoke 51 and the antenna 13 are rotated in synchronism with each other by means of a motor 52, the mechanical coupling between the motor and the yoke 51 and antenna 13 being indicated by the broken lines.

The potentiometer arm 34 is also rotated in a fixed time relation to the antenna rotation by means of a connection through gears indicated at 53. A battery 54 produces a flow of current through the resistor winding 36 so that a sawtooth voltage wave, illustrated at 56, is produced at the arm 34 as it slides along the resistor winding. In the example shown, the resistor winding 36 is wound on a portion of an insulating supporting ring 40.

In the present example, the potentiometer arm 34 is rotated 36 times per single rotation of the antenna 13. Thus, by applying the deflecting wave 56 to the deflecting yoke 51, the cathode ray of the tube 36 is deflected radially 36 times during one rotation of the yoke 51. It will be noted that it is during each of these radial deflections that the take-off beam sweeps across the storage screen 29 thereby causing the stored pulses to be applied to the control grid 43.

Since the reflected pulses are taken off the storage screen 29 in synchronism with the radial deflection at the tube 37, the spots 50 appearing on the radial traces on the indicator tube screen 49 are at distances from the center of the screen which correspond to the distances of the reflecting objects from the radar station. It will be apparent that each pulse taken off a storage element 28 by the take-off beam is a charge that has been built up by a plurality of the pulses reflected from an object. This is assuming that the said reflecting object is stationary or is not moving too rapidly whereby said plurality of pulses causes the put-on beam to build up the charges on the same storage element or elements of the screen 29. Noise signals, on the other hand, occur at random intervals and the stored charges produced by them will be distributed over the various storage elements 28 so that no large charge will be built up by the noise signals at any one point on the storage screen. As a result, an improvement in the signal-to-noise ratio is obtained.

The construction of the storage tube 18 will be described generally, no detailed description being necessary as the present invention does not cover the storage tube per se.

The put-on section 18a includes a cathode 61, the control electrode 17, a first anode 62, a second anode 63, and a collector electrode 64. Suitable voltages are applied to produce a high velocity put-on beam.

The take-off section 18b includes a cathode 66, a control electrode 67 held at a fixed bias potential, a screen grid 68, a first anode 69, and a second anode 71. Two ring or frame-like electrodes 72 and 73 are positioned between the second anode 71 and the screen 29 for slowing down the electrons of the beam after they leave the region of the second anode. Thus a low velocity take-off beam is obtained at the screen 29.

The storage screen 29 may comprise a supporting sheet of mica 76 which has the conducting strips 28 on the beam side and a metal coating 77 on the opposite side. In the example shown, the coating 77 is used as a signal plate for taking off the stored signals. It should be understood that the invention is not limited to the specific type of storage tube illustrated.

I claim as my invention:

1. A radar system comprising means for transmitting periodically recurring pulses of radio energy in the form of a directional radio beam, means for scanning a region by said beam, means for receiving said pulses after reflection from objects in said region, a cathode ray storage tube having a storage screen and including means for producing at least one cathode ray beam and directing it against said screen, means for deflecting a beam of said storage tube across said screen in synchronism with the transmission of said pulses, means for modulating said beam during said deflection by said received pulses whereby they are stored on said screen, a cathode ray indicator tube which includes a phosphorescent screen and means for producing a cathode ray that is directed toward said phosphorescent screen, means for producing a deflecting field for deflecting the cathode ray of the indicator tube radially, means for rotating said deflecting field in synchronism with said radio beam scanning, means for periodically taking signal off said storage screen only after a plurality of said first-mentioned deflections have occurred whereby the take-off repetition rate is substantially less than the repetition rate of said transmitted pulses, means for radially deflecting the cathode ray of said indicator tube in synchronism with said signal take-off, and means for supplying to an output lead the stored pulses taken off the storage screen by the beam during said signal take-off, and means for modulating the cathode ray of said indicator tube by the signal appearing in said output lead.

2. A radar system comprising means for transmitting periodically recurring pulses of radio energy in the form of a directional radio beam, means for scanning a region by said beam, means for receiving said pulses after reflection from objects in said region, a cathode ray storage tube having a storage screen and including means for producing a cathode ray put-on beam and a cathode ray take-off beam, means for deflecting said put-on beam across said screen in synchronism with the transmission of said pulses, means for modulating said put-on beam by said received pulses whereby they are stored on said screen, a cathode ray indicator tube which includes a phosphorescent screen and means for producing a cathode ray that is directed toward said phosphorescent screen, means for producing a deflecting field for deflecting the cathode ray of the indicator tube radially, means for rotating said deflecting field in synchronism with said radio beam scanning, means for deflecting the take-off beam of said storage tube across said storage screen only after a plurality of deflections of said put-on beam have occurred whereby the repetition rate is substantially less than the repetition rate of said transmitted pulses, means for radially deflecting the cathode ray of said indicator tube in synchronism with the deflection of said take-off beam, and means for supplying to an output lead the stored pulses taken off the storage screen by the take-off beam during its deflection, and means for modulating the cathode ray of said indicator tube by the signal appearing in said output lead.

MAX H. MESNER.

REFERENCES CITED

The following references are of record in the file of this patent:

UNITED STATES PATENTS

| Number | Name | Date |
| --- | --- | --- |
| 2,403,562 | Smith | July 9, 1946 |
| 2,412,669 | Bedford | Dec. 17, 1946 |
| 2,430,038 | Wertz | Nov. 4, 1947 |